March 10, 1942.  C. YOUNG  2,276,137
X-RAY BUCKY DIAPHRAGM SUPPORT
Filed June 14, 1940  2 Sheets-Sheet 1

Inventor
Carl Young
By Williamson & Williamson
Attorneys

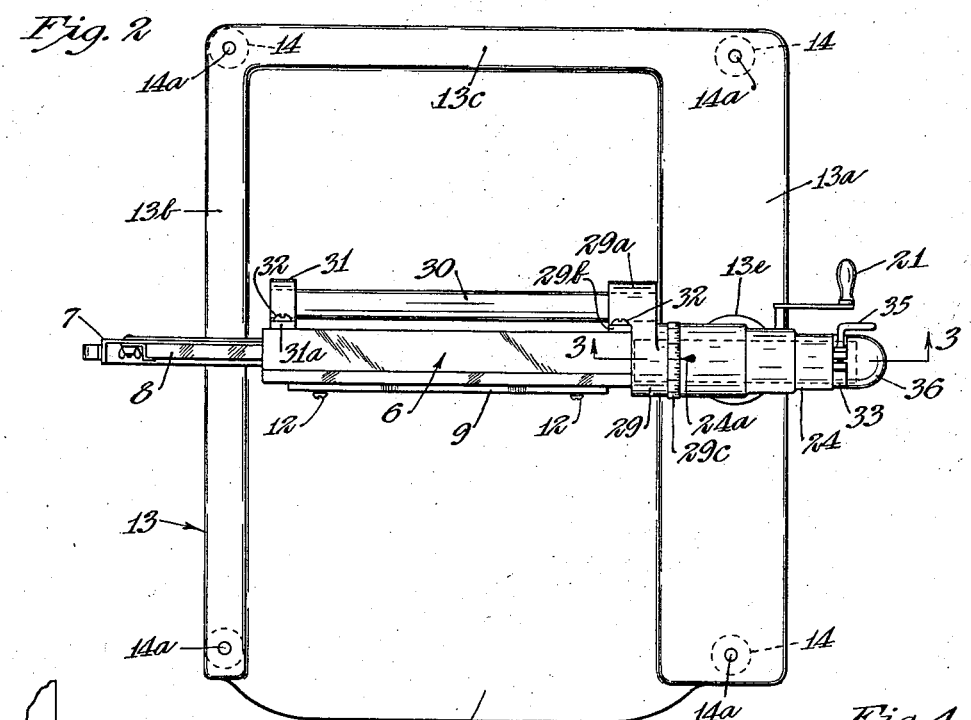
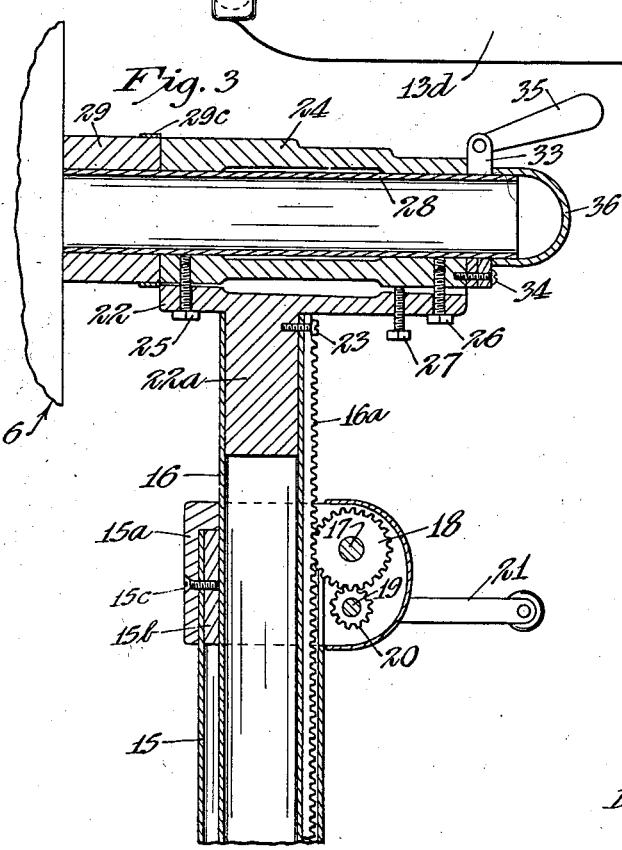
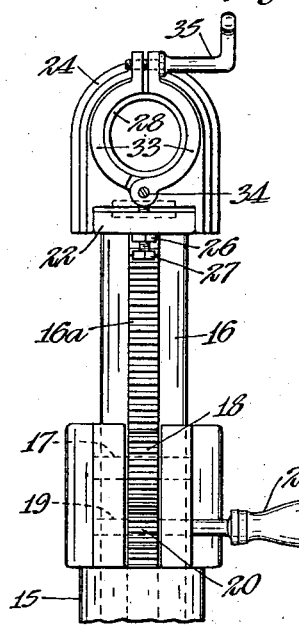

Patented Mar. 10, 1942

2,276,137

UNITED STATES PATENT OFFICE 2,276,137

X-RAY BUCKY DIAPHRAGM SUPPORT

Carl Young, Minneapolis, Minn.

Application June 14, 1940, Serial No. 340,511

4 Claims. (Cl. 250—58)

My invention pertains to X-ray apparatus and particularly to apparatus for supporting a Bucky diaphragm and a radiograph subject.

In the practice of radiography, X-ray pictures are often made in connection with studies concerning posture, spinal curvature conditions and other conditions of the human body wherein the positional relations of various bones relative to the vertical are of primary importance. In such radiographic work it is essential that the standing or sitting human subject be placed on a plane surface which is accurately placed in a horizontal plane so that the subject will not assume some undesired position such as would be assumed if the subject were supported by a sloping surface. For reference to the vertical it is particularly desirable that the finished X-ray picture or radiograph have thereon a vertical line and, when the radiograph is being taken, conditions must be such that the vertical reference line will be accurately vertically disposed. In making radiographs, it is the usual practice to place the sensitized film in a cassette carried by a tray which is placed in the interior space of a Bucky diaphragm the front face element of which is transparent to X-rays. The subject is placed before the film-containing Bucky diaphragm unit and the X-rays are directed through the subject into the front of the Bucky diaphragm unit so as to impinge upon the film therewithin. In many instances the Bucky diaphragm unit is disposed in a vertical plane but it is also desirable to be able to place the Bucky diaphragm unit in various planes inclined to the vertical so as to conform to the forwardly or rearwardly inclined position of a portion of a human body of which radiographs are being taken.

An object of my invention is to provide a common supporting structure for a Bucky diaphragm unit and a subject so that the portions thereof supporting respectively the Bucky diaphragm unit and the subject may be adjustively leveled as a unit.

Another object is to provide such supporting apparatus including a plane surface for support of the subject and means for leveling the apparatus for disposing the plane surface accurately in a horizontal plane.

Yet another object is to provide such apparatus having a vertically extensible Bucky supporting column which is placed in vertical position incidental to placing the subject-supporting surface in a horizontal plane.

Still another object is to provide such apparatus wherein the Bucky diaphragm unit may be rotatively swung to any inclined position throughout a range of 360 degrees about an axis which may be adjusted to exact parallel relation with the subject-supporting surface whereby a centerline placed on the Bucky diaphragm unit will remain in a plane perpendicular to the subject-supporting surface.

A further object is to provide such apparatus wherein the Bucky diaphragm unit is supported entirely from one side thereof so that the remaining side is always accessible for removal of the film tray without the necessity for removal of the Bucky diaphragm unit from its support when the film is being placed in or removed from the Bucky diaphragm unit.

A yet further object is to provide such apparatus wherein the Bucky diaphragm unit is provided with an exteriorly visible centerline unit which constitutes a reference line for use in adjusting the apparatus and which is made of material which is opaque to X-ray so that the accurately vertical centerline will appear on a radiograph made with my apparatus.

A still further object is to provide such apparatus of relatively light, simple, compact, rugged, easily operated and inexpensive construction.

These and other objects and advantages of the invention will more fully appear from the following description made in connection with the accompanying drawings, wherein like reference characters refer to the same parts throughout the views, and in which:

Fig. 2 is a top plan view;

Fig. 3 is a partial vertical sectional view taken on the line 3—3 of Fig. 2 as indicated by the arrows;

Fig. 4 is a vertical side view of the structure shown in Fig. 3 with certain parts removed.

Figure 1:
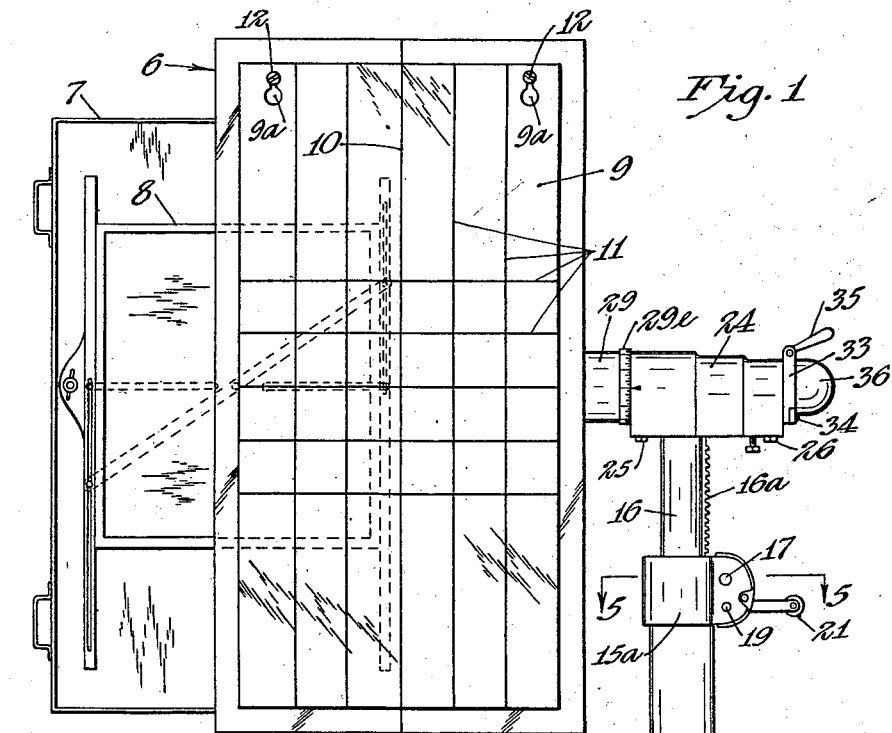
Fig. 1 is a partially broken-away front view of an embodiment of my invention.
Figure 5:
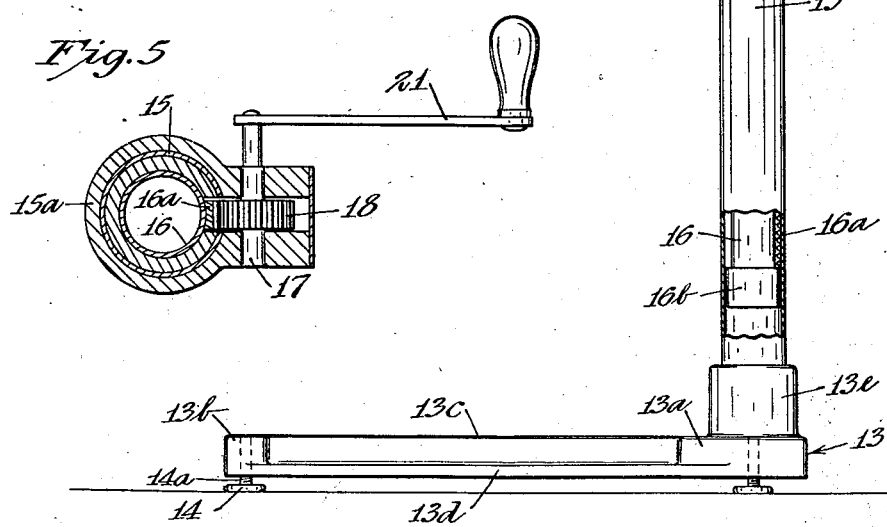
Fig. 5 is a partial horizontal sectional view taken on the line 5—5 of Fig. 1 as indicated by the arrows.

Referring to the drawings, I show, in operative relation with other parts of my complete apparatus, a Bucky diaphragm unit 6 which is, in general, of conventional design and which contains the usual removable tray 7 carrying a conventional film-receiving cassette 8. The tray 7 is slidable into the interior space of the Bucky unit 6 and is shown in Fig. 1 in a partially removed position. In accordance with common practice the front wall of the Bucky unit 6 is made of sheet material which is transparent to X-rays. Since the Bucky unit 6, the tray 7 and the cassette 8 are of conventional construction it is not believed necessary, for the purposes of this application, to describe the same in further detail.

On the front of the Bucky diaphragm unit 6 I provide a removable auxiliary sheet 9 of material which is transparent to X-rays and, on this sheet 9, I provide an elongated thin element 10 which is secured in any suitable manner to the face of the sheet 9 in such position as to constitute a longitudinal centerline for the Bucky diaphragm unit 6 for use in adjusting the apparatus in a manner to be described. Preferably the centerline element 10 is made of material opaque to X-rays so that it will cast a shadow on film in the Bucky diaphragm unit 6 during an X-ray exposure to make a centerline on the radiograph picture. If desired a set of co-ordinate lines 11 may be also placed on the auxiliary sheet 9 as indicated in Fig. 1, and these co-ordinate lines would preferably be made of material opaque to X-rays. The upper portion of the auxiliary sheet is provided with a pair of apertures 9a which are narrowed in their upper portions and which co-operate with elements such as the screws 12 carried by the Bucky diaphragm unit 6 to enable removable attachment of the auxiliary sheet 9 to the Bucky diaphragm unit 6. If desired, the auxiliary sheet 9 may be omitted and the centerline element 10 and coordinate line elements 11 may be placed directly on the front face of the Bucky diaphragm unit 6.

To support the Bucky diaphragm unit 6 and also a human subject for a radiograph picture I provide a relatively large flat horizontally disposed base 13 having relatively thick and strong marginal portions 13a, 13b and 13c along the side and rear edges thereof. The central portion 13d has a plane upper face constituting a platform or surface on which a human subject may stand or upon which a chair for the subject to sit on may be placed. I provide adjustable means whereby the base 13 may be leveled to bring the plane upper face of the central portion 13d of the base 13 into exact horizontal position even though the base 13 is placed on a floor or the like which is not level. For this purpose I provide, at each corner of the base 13, a foot 14 which carries an externally screw-threaded upstanding shank 14a screw-threadedly engaged in a suitably apertured and internally screw-threaded portion of the base 13. It should be apparent that suitable rotations of the respective feet 14 will level up the base 13 to place the previously mentioned plane subject-supporting surface in exact horizontal position.

On the right-hand thickened marginal portion 13a of the base 13 I form an upstanding cylindrically recessed boss 13e in which the lower end of an upstanding tubular member 15 is rigidly secured. A tubular element 16 of somewhat less diameter than the member 15 is longitudinally telescoped into the interior of the tubular member 15 so that the tubular member 15 and the tubular element 16 together form an extensible vertical column or supporting structure. A collar 15b is snugly fitted in the upper end of the tubular member 15 and has an internal diameter enabling snug sliding movement of the tubular element 16 therethrough. A radially outwardly projecting, longitudinally extending toothed rack 16a is formed on the exterior surface of the tubular element 16 and the collar 15b is suitably cut away to leave a gap to accommodate the rack 16a. The rack 16a and the gap in the collar 15b function as a key and keyway to restrain the tubular element 16 from rotation relative to the tubular member 15. A body 15a is formed on the upper end of the tubular member 15 and is suitably formed, cut away and apertured to receive in journalled relation a shaft 17 carrying a gear 18 which is in mesh with the teeth of the rack 16a. A screw 15c is provided, as shown in Fig. 3, to fixedly interconnect the tubular member 15, the body 15a and the collar 15b so as to prevent rotation of one thereof relative to the other. The lower end of the tubular element 16 carries a collar 16b suitably secured thereon and having such an external diameter as to snugly slide within the tubular member 15. The tubular member is, of course, suitably apertured to afford access of the gear 18 to the rack 16a. A second shaft 19 is journalled in suitably apertured portions of the body 15a and carries a gear 20 non-rotatably mounted thereon and meshed with the first gear 18. Exteriorly of the body 15a the shaft 20 carries a crank 21 which may be operated to raise or lower the tubular element 16 relative to the tubular member 15.

On the upper end of the tubular element 16 I provide a generally horizontal member 22 which includes a downwardly projecting cylindrical portion 22a which is snugly telescoped into the upper end of the tubular element 16 and which is secured therein by suitable means such as the screw 23. A flat bottomed, longitudinally apertured bearing member 24 is placed on top of the member 22 as shown in Figs. 2 and 3. The top surface of the member 22 is inclined slightly downwardly to the right as shown in Fig. 3. At the left-hand ends thereof the member 22 and the bearing 24 are apertured in registration, and a screw 25 is placed in the apertures. The screw merely projects through the member 22 but is screw-threadedly engaged in internal screw threads provided in the apertured portion of the bearing 24. A screw 26 is associated in the same manner as the screw 25 with the right-hand ends of the member 22 and the bearing 24. Inwardly of the screw 26 the member 22 is apertured and internally screw-threaded and a screw 27 is screw-threadedly engaged in this screw-threaded portion of the member. The free or upper end of the screw 27 bears against the bottom of the right end of the bearing 24 to function as an adjusting jack for rocking the bearing 24 vertically with the mutually contacting left-hand ends of the bearing 24 and the member 22 acting as a fulcrum. The screws 25 and 26 function as hold-down screws for the bearing 24. It should be seen that suitable manipulation of the screws 25, 26 and 27 may be utilized as a means of adjustively rocking the bearing vertically and that the screws 25, 26 and 27 may be tightened in suitable respective positions to hold the bearing in an adjusted position thereof.

Journalled in the bearing 24 is a tubular shaft 28 carrying, immediately to the left of the bearing 24, a collar 29 fixed on the shaft 28 and having thereon an eccentrically positioned integral element 29a which is apertured in a direction parallel to the axis of the shaft 28. An outwardly extending member 30, disposed parallel to the axis of the shaft 28, is secured at its inner end in the apertured element 29a and carries on its remaining end a collar 31. The element 29a and the collar 31 respectively have apertured lugs 29b and 31a formed thereon and to which the rear side of the Bucky diaphragm unit 6 is secured by suitable means such as the screws 32. The distance of offset of the member 30 from the axis of the shaft 28 is such that the axis of the shaft 28 is in the central plane of the Bucky diaphragm unit 6 and the element 29a and the collar 31 are secured to the Bucky diaphragm unit at points centrally located between the respective ends of the Bucky diaphragm unit 6 so that the Bucky diaphragm unit 6 will rotate about its center of mass when the shaft 28 is rotated and will tend to remain in any adjustively rotated position thereof independently of the effects of gravity. To indicate the angle at which the Bucky diaphram unit is disposed, the collar 29 is provided with a circumferentially extending scale 29c graduated in angular degrees and an index mark or pointer 24a is provided on the bearing 24 for cooperation with the scale 29c.

At the right-hand end of the bearing 24 a pair of substantially semi-circular cooperating clamping elements 33 are mounted at apertured lower ends thereof on a screw 34 carried by the bearing 24, as shown in Figs. 3 and 4. The upper ends of the respective clamping elements 33 are apertured and a handled clamping screw 35 projects through the apertured upper end of one of the clamping elements 33 into screw threads provided in the apertured portion of the other clamping element so that the clamping elements may be drawn towards each other or permitted to spread apart by manipulating the screw 35. The pair of clamping elements 33 is in encircling relation with a portion of the shaft 28 which projects beyond the bearing 24. A dome-shaped cap 36 is snugly telescoped over the right-hand end of the shaft 28.

The centerline 10 on the Bucky diaphragm unit 6 is carefully placed in perpendicular relation with the axis of the tubular shaft 28 when the apparatus is built so that the centerline 10 will remain in a plane perpendicular to the subject-supporting surface of the base 13 throughout rotation of the Bucky diaphragm unit 6 through a complete revolution if the longitudinal axis of the shaft 28 is disposed parallel to the subject-supporting surface. Placement of the shaft 28 in parallel relation with the subject-supporting surface is accomplished by manipulation of the adjusting screws 25, 26 and 27 and, during this manipulation, the Bucky diaphragm unit 6 should be disposed in a vertical plane so that a plumb line may be used in conjunction with the centerline 10 as a guide in obtaining an accurate adjustment. The base 13 should, of course, be leveled up by means of the adjustable feet 14 before the above adjustments are made. A spirit level placed on the subject-supporting surface of the base 13 may be used as a guide in obtaining accurate leveling of the base 13.

With adjustments made as described above, a human subject may stand on the subject-supporting surface of the base 13 in a position before the Bucky diaphragm unit 6. Since the subject-supporting surface is exactly level the subject's posture will be as desired for taking of radiograph pictures. The centerline 10 will be disposed exactly in a vertical plane and its image will appear on the finished radiograph picture for use as a reference line which can be relied upon to accurately indicate the position of a vertical plane intersecting the subject. When the subject is leaning forwardly or rearwardly or a radiograph picture is being taken of an inclined portion of the subject's anatomy the Bucky diaphragm unit may be inclined to correspond and the centerline 10 will still remain in a vertical plane. For taking radiograph pictures of various portions of a subject's anatomy or accommodating subjects of various heights the Bucky diaphragm may be raised and lowered by manipulating the crank 21 and this adjustment will not affect the relation of the centerline 10 with the vertical.

The previously described adjustments of the adjustable feet 14 and the screws 25, 26 and 27 are made when the apparatus is originally installed in the location in which it is to be used but may be repeated later on to compensate for possible sagging of the floor upon which the apparatus rests or wear in the bearing 24.

With the Bucky diaphragm unit 6 supported from one side only, as in my apparatus, it should be seen that the tray 7 may be readily placed in and removed from the Bucky diaphragm unit 6 without the need for removing the Bucky diaphragm unit 6 from its support.

It should be seen that my apparatus enables extremely flexible and convenient use of the Bucky diaphragm unit 6 in various positions for taking a great variety of types of radiograph pictures and affords an exactly horizontal plane subject-supporting surface with which the Bucky diaphragm supporting structure is associated in fixed relationship. It also should be seen that the centerline element 10 functions as a guide in adjusting the apparatus and also as a means of producing an accurate reference line on the finished radiograph picture.

It is apparent that I have invented a novel, simple, compact, rugged and particularly effective apparatus for supporting both a Bucky diaphragm unit and a radiograph picture subject and enabling rapid and convenient operation to obtain radiograph pictures which are accurate and include an accurately positioned reference line.

It will, of course, be understood that various changes may be made in the form, details, arrangement and proportions of the various parts without departing from the scope of my invention.

What is claimed is:

1. A combined X-ray Bucky and subject supporting apparatus comprising a subject supporting base forming a plane subject supporting surface disposed in a horizontal plane, an upstanding supporting structure rigidly fixed to said base adjacent an edge of said surface, a member carried by the upper portion of said supporting structure and projecting therefrom substantially horizontally to extend above said surface, an X-ray Bucky, means rotatably supporting said Bucky above said surface on said member for 360° rotation on said member, and means connecting said member to the upper portion of said supporting structure for adjustive tilting movement of said member in a vertical plane to enable accurate placement of said member in exact parallel relation with said surface.

2. A combination X-ray Bucky and subject supporting apparatus comprising, a subject supporting base having a plane surface upon which the subject is supported, an upstanding standard fixed to said base, an arm holder carried by said standard, an arm mounted in said holder for rotation relative to said standard and base and projecting outwardly from said standard to a position over said subject supporting surface, means for tiltably leveling said arm holder relative to said standard to accurately position said arm and arm holder so that the axis of rotation of said arm is exactly parallel to said surface, and an X-ray Bucky carried by said arm above said surface.

3. The structure defined in claim 2, said Bucky including an X-ray film holding cassette and a center line element adjacent the film holding portion of said cassette and formed of material which is relatively opaque to X-rays, said center line element being set perpendicular to said axis to cast as the film is exposed its shadow on the film in a line perpendicular to said supporting base irrespective of the position of rotation of said arm and form a line on the developed negative for the comparative analysis of the location of the matter reproduced on the negative.

4. A combined X-ray film holder and subject supporting apparatus having in combination a subject supporting base forming a subject supporting surface accurately horizontally disposed, a film holder, means for mounting said film holder relative to said subject supporting base for rotation about an axis parallel to said base and a center line forming element of a material relatively opaque to X-rays set perpendicular to said axis and located and supported adjacent the film holder in position to cast a shadow line on the film as it is exposed and form a line on the developed negative for determining the relative location of matter reproduced on the film, the said shadow line falling at all times in a plane perpendicular to the supporting base irrespective of the position of rotation of said film holder about said axis.

CARL YOUNG.